(12) United States Patent
Buck

(10) Patent No.: US 10,086,440 B2
(45) Date of Patent: Oct. 2, 2018

(54) CUTTING TOOL APPARATUS

(71) Applicant: WOHLHAUPTER GmbH, Frickenhausen (DE)

(72) Inventor: Guenter Buck, Huelben (DE)

(73) Assignee: WOHLHAUPTER GmbH, Frickenhausen (DE)

( * ) Notice: Subject to any disclaimer, the term of this patent is extended or adjusted under 35 U.S.C. 154(b) by 0 days.

(21) Appl. No.: 15/664,004

(22) Filed: Jul. 31, 2017

(65) Prior Publication Data

US 2018/0001392 A1 Jan. 4, 2018

Related U.S. Application Data

(63) Continuation of application No. PCT/EP2016/052254, filed on Feb. 3, 2016.

(30) Foreign Application Priority Data

Feb. 5, 2015 (DE) .................. 10 2015 101 644

(51) Int. Cl.
*B23Q 17/00* (2006.01)
*B23B 29/034* (2006.01)

(52) U.S. Cl.
CPC .... *B23B 29/0341* (2013.01); *B23B 2260/024* (2013.01); *B23B 2260/128* (2013.01); *B23B 2270/32* (2013.01)

(58) Field of Classification Search
CPC ............ B23B 2270/48; B23B 2270/32; B23B 2260/128; B23B 2250/04;
(Continued)

(56) References Cited

U.S. PATENT DOCUMENTS 2,590,420 A * 3/1952 Lagher .............. B23B 29/03414
279/6
4,676,127 A * 6/1987 Watanabe ......... B23B 29/03439
33/710

(Continued)

FOREIGN PATENT DOCUMENTS

CH          473636        6/1969
DE      102009017094    10/2010
(Continued)

*Primary Examiner* — Will Fridie, Jr.
(74) *Attorney, Agent, or Firm* — Lipsitz & McAllister, LLC

(57) ABSTRACT

The invention relates to a cutting tool apparatus comprising a tool head rotatingly drivable about an axis of rotation, which tool head has a tool slide adjustable along an adjustment axis and an electrical measuring device for detecting an adjustment path of the tool slide, and comprising an external display device which is mechanically and electrically releasably connectable to the tool head and has a display unit for displaying the adjustment path of the tool slide. In order to further develop the cutting tool apparatus such that its handling is simplified, it is proposed according to the invention that the display device is mechanically securable on the stationary tool head in order to set the tool slide and is automatically releasable from the tool head if a predeterminable rotational acceleration of the tool head is exceeded.

20 Claims, 7 Drawing Sheets

(58) Field of Classification Search
CPC ........ B23B 29/03489; B23B 29/03407; B23Q 17/00; B23Q 17/22; B23Q 17/2216; B23Q 17/2225
See application file for complete search history.

(56) References Cited

U.S. PATENT DOCUMENTS

| | | | |
|---|---|---|---|
| 8,028,435 B2 | 10/2011 | Basett | |
| 8,684,638 B2 | 4/2014 | Buck | |
| 8,899,135 B2 | 12/2014 | Frank et al. | |
| 9,849,518 B2* | 12/2017 | Da Silva | B23B 29/03417 |
| 2007/0297866 A1* | 12/2007 | Bassett | B23Q 17/2225 |
| | | | 408/16 |
| 2012/0034040 A1 | 2/2012 | Frank et al. | |
| 2012/0269590 A1* | 10/2012 | Buck | B23B 29/03407 |
| | | | 408/16 |
| 2016/0114402 A1* | 4/2016 | Chen | B23B 29/03 |
| | | | 408/189 |

FOREIGN PATENT DOCUMENTS

| | | |
|---|---|---|
| DE | 102009051843 | 5/2011 |
| EP | 1758710 | 3/2007 |
| EP | 2493647 | 9/2012 |
| KR | 1020090122588 | 12/2009 |
| WO | 2006000746 | 1/2006 |
| WO | 2010119931 | 10/2010 |
| WO | 2011051355 | 5/2011 |

* cited by examiner

CUTTING TOOL APPARATUS

This application is a continuation of international application number PCT/EP2016/052254 filed on Feb. 3, 2016 and claims the benefit of German application number 10 2015 101 644.3 filed on Feb. 5, 2015, which are incorporated herein by reference in their entirety and for all purposes.

BACKGROUND OF THE INVENTION

The invention relates to a cutting tool apparatus comprising a tool head rotatingly drivable about an axis of rotation, which tool head has a tool slide adjustable along an adjustment axis and an electrical measuring device for detecting an adjustment path of the tool slide, and comprising an external display device which is mechanically and electrically releasably connectable to the tool head and has a display unit for displaying the adjustment path of the tool slide.

From the publication EP 2 493 647 B1 there is known a cutting tool in the form of a precision turning tool, with the aid of which mainly bores with narrow tolerances are machined. The tool head of the precision turning tool can be clamped into the spindle of a machine tool and set in rotation about an axis of rotation by means of the machine tool. The tool head has a tool slide, on which a cutting plate holder is mountable. A cutting plate can be secured on the cutting plate holder in order to machine a bore in a material-removing manner. In order to set a desired turning or boring radius, the tool slide can be adjusted radially with respect to the axis of rotation of the tool body with the aid of a separate adjusting tool, for example a polygonal tool. The adjustment path of the tool slide can be detected by means of a measuring device of the precision turning tool and displayed to the user on a display unit. The display unit is integrated into the tool head, so that the user when adjusting the tool slide can read the adjustment path in a simple manner on the display unit. For tool heads with a relatively large diameter, such a configuration has proved successful. However, if the tool head has only a small design, the size of the display unit is limited and the adjustment path can no longer be displayed in an easily readable manner.

From EP 1 758 710 B2 there is known a cutting tool apparatus in which the display device is not integrated into the tool head but into the separate adjusting tool, with the aid of which the tool slide can be adjusted. The adjustment path of the tool slide can be detected by means of the measuring device of the tool head, and an electrical connection can be established between the measuring device and the display device of the adjusting tool by means of contact elements arranged laterally on the tool head.

From the publication DE 10 2009 017 094 A1 there is known a cutting tool apparatus in which measurement information can be transmitted from the measuring device of the tool head by radio to an external display device. The display device has a permanent magnet which serves as a holding device and makes it possible to fix the external display device on a magnetisable metal body, for example on the machine tool. The display device can thereby be positioned in a place ergonomically favourable for an operator. However, metal chips frequently collect on the permanent magnet and this makes the handling of the cutting tool apparatus difficult.

There are also known cutting tool apparatuses in which the external display device is electrically connected to the measuring device of the tool head via a cable. For this purpose, a magnetic plug can be placed on a complementarily configured interface of the tool head, in order to transmit measurement information from the measuring device via the cable to the external display device. The user has the possibility to hold the external display device with one hand and adjust the tool slide with his other hand by means of the adjusting tool. The disadvantage of such a configuration is that the user cannot have both hands free to be able to carry out a precise adjustment of the tool slide and of the cutting plate holder.

The object of the present invention is to further develop a cutting tool apparatus of the type mentioned at the outset such that it has a simplified handling.

SUMMARY OF THE INVENTION

This object is achieved in accordance with the invention in a cutting tool apparatus of the type in question in that the display device is mechanically securable on the stationary tool head in order to set the tool slide and is automatically releasable from the tool head if a predetermined rotational acceleration of the tool head is exceeded.

To set the tool slide the external display device of the cutting tool apparatus according to the invention is mechanically secured on the tool head, and in so doing the tool head does not perform a rotational movement but is stationary. The user has both hands free for adjusting the tool slide, so that he can adjust the tool slide very precisely. Since the external display device is mechanically securable on the stationary tool head, the user can read the adjustment path displayed on the display unit in a simple manner when adjusting the tool slide. The size of the display unit is not predetermined by the constructional size of the tool head, but can be chosen of sufficient size, irrespective of the tool head, so that the displayed adjustment path can be easily read. The mechanical securing of the external display device on the tool head ensures that the display device is not unintentionally released from the tool head on the setting operation of the tool slide. Nevertheless, the securing on the tool head involves the risk that the user may forget to remove the display device from the tool head before setting the tool head in rotation. This could result in the display device rotating together with the tool head and being hurled away from the latter in the radial direction. In order to counteract this danger, the display device in the cutting tool apparatus according to the invention is automatically releasable from the tool head as soon as the latter exceeds a predetermined rotational acceleration. When the tool head is set in rotation to machine a workpiece, it is typically subjected to high rotational accelerations in order to reach its nominal rotational speed within a short time. The critical value of the rotational acceleration, on the exceeding of which the display device is automatically released from the tool head, can be chosen to be very small. This ensures that the display device, inadvertently left on the tool head when the tool head is set in rotation, is automatically released from the tool head even before the latter has reached a high rotational speed, and this in turn has the advantage that the display device can at most be slightly hurled in the radial direction by the rotating tool head, but rather falls more or less vertically downwards owing to its weight force if the tool head exceeds the predetermined rotational acceleration. It is thereby ensured that the display device being automatically released from the tool head does not constitute a risk of injury to the user if he forgets to release the display device from the tool head when the tool head is set in rotation.

If the tool head with the display device mechanically secured thereon is inadvertently set in rotation, the tool head undergoes a high rotational acceleration. According to the invention, it has been found that the rotational acceleration of the tool head can by utilised for automatically releasing the display device from the tool head. For this purpose, it is advantageous when the display device is layable onto a lateral surface of the tool head, preferably in a joining direction orientated obliquely or perpendicularly to the axis of rotation. The display device can thus be positioned laterally on the tool head. If the tool head with the display device held thereon is inadvertently set in rotation about its axis of rotation to machine a workpiece, the display device lying on the outside of the tool head undergoes considerable tilting moments owing to its inertia, which are dependent on the rotational acceleration of the tool head. The greater the rotational acceleration is, the greater are also the tilting moments acting in the circumferential direction of the tool head on the display device. The mechanical and electrical connection of the display device to the tool head can be configured in such a manner that the display device is automatically released from the tool head under the effect of a tilting moment of a predetermined size acting in the circumferential direction of the tool head.

It is favourable when the tool head has a cylindrical lateral surface and the display device has a plane rear side, with which it contacts the cylindrical lateral surface linearly. On both sides of the linear contact region, the display device thus protrudes with its rear side from the tool head. This facilitates the automatic release of the display device from the tool head, as soon as the latter exceeds a predetermined rotational acceleration.

Provision may be made for the display device to be releasably latchable to the stationary tool head. For this purpose, latching elements cooperating with one another in the sense of a latching connection may be used, which are arranged on the display device and on the tool head, the latching connection being automatically releasable as soon as the tool head exceeds a predetermined rotational acceleration. The latching elements may, for example, engage in one another in a spring-mounted manner. It is favourable when the spring force of the latching elements is predeterminable. This makes it possible to predetermine the spring force in the manufacturer's works of the display device in such a manner that the display device is automatically released from the tool head if a predetermined, relatively low rotational acceleration of the tool head is exceeded.

In a preferred configuration of the invention, the display device has at least one holding member, the tool head being subjectable to a predeterminable holding force by the at least one holding member. Owing to predetermining of the holding force by the manufacturer, it can be ensured in a constructionally simple manner that the display device is automatically released from the tool head if the latter exceeds a predetermined rotational acceleration on the setting in rotation.

It is particularly advantageous when the at least one holding member has a setting mechanism for setting the holding force exerted on the tool head by the holding member. The setting mechanism may, for example, be actuated in the manufacturer's works of the display device for predetermining a specific holding force which is exerted on the tool head by the holding member, in order on the one hand to ensure that the display device is mechanically securable on the stationary tool head, and on the other hand to ensure that the display device is automatically released from the tool head if the latter exceeds a predetermined rotational acceleration.

The setting mechanism may, for example, have a setting screw. This facilitates the setting of the holding force.

It is particularly favourable when the at least one holding member is able to be mechanically brought into engagement with the tool head. The holding member is thus engageable and by the engagement of the holding member with the tool head, it is possible to ensure in a constructionally simple manner that the display device is securable in a mechanically loadable manner on the stationary tool head and is releasable from the tool head if a predetermined rotational acceleration is exceeded.

It is of particular advantage when the display device has two holding members which are insertable into two holding recesses arranged at a distance from one another in the direction of rotation of the tool head. In such a configuration the tool head has two holding recesses which are arranged at a distance from one another in the direction of rotation of the tool head and into each of which a holding member of the display device can be inserted.

Favourably the holding member inserted into a holding recess exerts a predeterminable holding force on a wall of the holding recess.

The holding recesses are favourably open at their outer sides facing away from one another. The holding recesses may, for example, be formed open on one side. This facilitates the release of the holding members from the holding recesses, as soon as the tool head exceeds a predetermined rotational acceleration.

The holding recesses may, for example, each have a plane bottom wall and a side wall U-shaped in the plan view of the holding recesses. The side walls may each have two straight end sections which lie opposite one another and are connected to one another via a curved middle section.

At their mutually facing inner sides the holding recesses have, in an advantageous embodiment of the invention, each at least one latching element which cooperates with an associated latching element of the holding member insertable into the holding recess.

Provision may be made, for example, for a latching indentation to be arranged in each case at the mutually facing inner sides of the holding recesses, into which latching indentation a latching projection of the holding members latches. In this case it is of advantage when the latching projections penetrating into the latching indentations are subjectable to a predeterminable spring force in the direction of the latching indentations. The spring force is favourably settable by means of a setting mechanism of the holding members.

It is favourable when the holding members form a form closure with the holding recesses. By means of the form closure it can be ensured in a constructionally simple manner that the display device is automatically released from the tool head only when the tool head exceeds a predetermined rotational acceleration. In particular it can be ensured by the form closure that the external display device is not unintentionally released from the stationary tool head.

In an advantageous configuration of the invention, the holding members receive between them a holding section of the tool head extending over an angular region of less than 180° in the direction of rotation of the tool head. The two holding members can clamp the holding section of the tool head between them and thereby mechanically secure the display device on the stationary tool head.

It is favourable when the holding section extends over an angular region of less than 90° in the direction of rotation of the tool head.

In a preferred configuration of the invention, the holding members have spring-mounted pressure pieces lying opposite one another. By means of the spring-mounted pressure pieces, a holding force can be exerted on the tool head by the holding members.

The spring-mounted pressure pieces are favourably aligned flush with one another.

Provision may be made for the pressure pieces to each have a pressure body which is subjectable to a spring force by a compression spring, the spring forces of the two pressure pieces being directed opposite one another. The spring forces enable the external display device to be fixed on the stationary tool head by the pressure bodies, subjected to the spring forces, clamping a holding section of the tool head between them, which holding section extends over an angular region of less than 180° in the direction of rotation of the tool head.

It is of advantage when the distance between the two pressure pieces is variable. This makes it possible to position the pressure pieces at a smaller or larger distance from one another and thereby set the holding forces exerted by the pressure pieces on the holding section of the tool head lying between them.

In a preferred configuration of the invention, the holding members each have a guide part in which a pressure piece is arranged. Provision may be made, for example, for the pressure pieces each to be screwed into a guide part. For this purpose, the pressure pieces may have an external thread which engages with an internal thread of a guide part. The guide parts may be configured in the manner of a sleeve.

The holding members are favourably configured as projections which project from a rear side of the display device facing the tool head. Preferably, the rear side of the display device lies on a lateral surface of the tool head. The holding members which each form a projection can be arranged symmetrically at a distance from the region on which the rear side lies and can penetrate into associated holding recesses of the tool head.

To establish an electrical connection between the measuring device of the tool head and the display unit of the display device, the display device and the tool head have, in an advantageous configuration of the invention, electrical contact elements associated with one another.

The contact elements of the display device and/or of the tool head can be of spring-loaded form, so that the contact elements of the display device and of the tool head are pressed against one another when the display device is mechanically and electrically held on the stationary tool head.

Preferably, the contact elements of the display device are arranged axially offset from the holding members, with respect to the axis of rotation of the tool head. In such a configuration, the contact elements of the tool head occupy a position axially offset from the holding region of the tool head which extends between the two holding recesses, into which the holding members are insertable.

Preferably, the tool head has a contact recess, in which the contact elements of the tool head are arranged. The contact recess forms an indentation which is preferably arranged on a cylindrical lateral surface of the tool head and which receives the contact elements of the tool head. The contact elements of the display device can penetrate into the contact recess and electrically and mechanically contact the contact elements of the tool head which are arranged there.

As mentioned at the outset, the tool head may have a small constructional size. In particular, provision may be made for the diameter of the tool head to be at most 20 mm, in particular 19 mm. By the use of the external display device the user can, despite the relatively small constructional size of the tool head, be provided with an easily readable display unit which enables the user to reliably adjust the tool slide and with the latter also the cutting plate holder and the cutting plate secured thereon.

The following description of an advantageous embodiment of the invention serves, in conjunction with the drawings, for more detailed explanation.

DETAILED DESCRIPTION OF THE INVENTION

Figure 1:
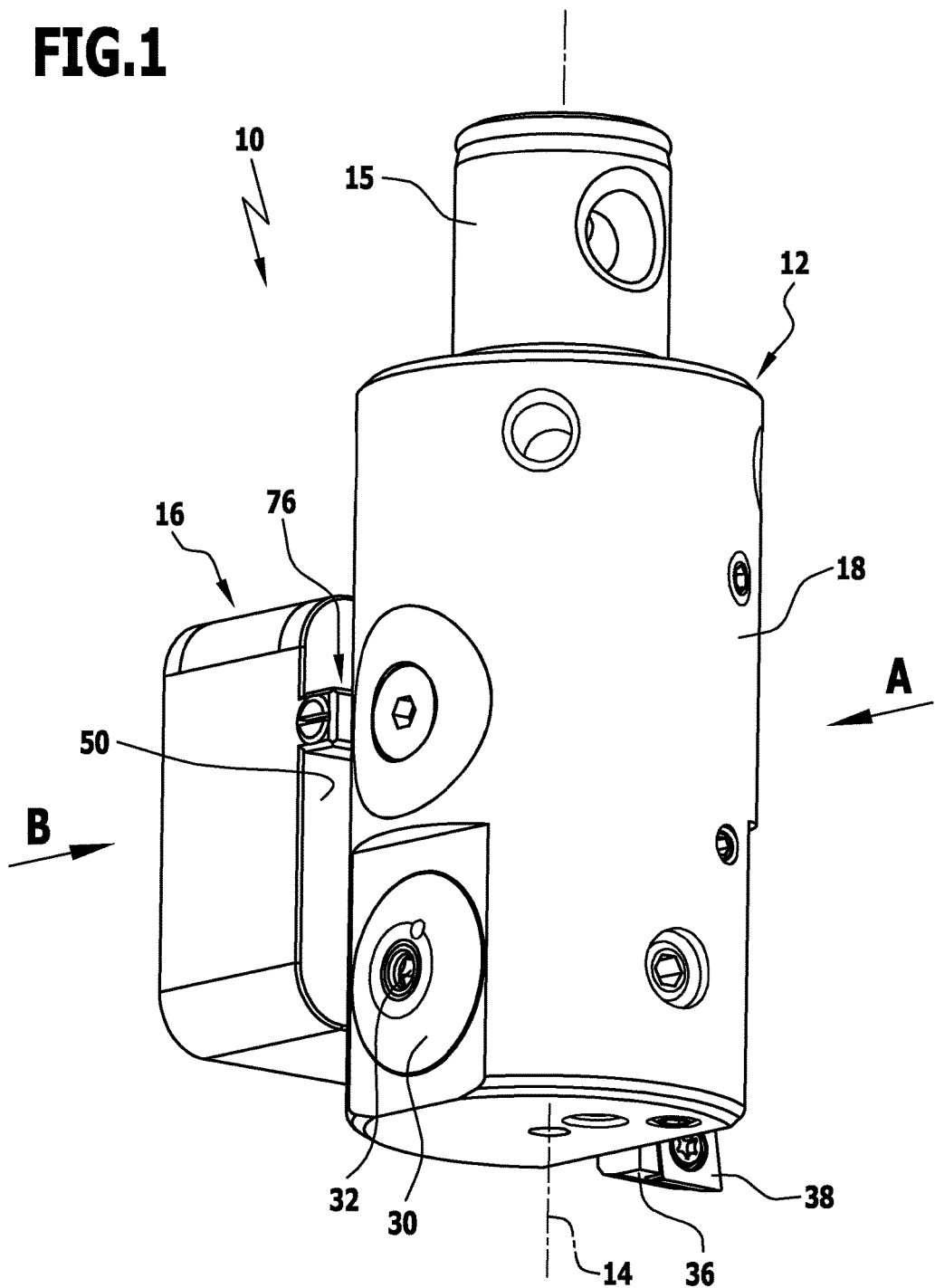
FIG. 1: shows a perspective illustration of a cutting tool apparatus having a tool head and an external display device mounted laterally on the tool head.

An advantageous embodiment of a cutting tool apparatus according to the invention is illustrated schematically in the drawing and designated as a whole by the reference symbol 10. It comprises a tool head 12 which is rotatingly drivable about an axis of rotation 14, and an external display device 16. The display device is laterally layable onto a lateral surface 18 of the tool head and mechanically securable on the tool head 12, provided that the tool head 12 is not performing a rotational movement but is stationary. When the tool head 12 is set in rotation about the axis of rotation 14, the display device 16 is automatically released from the tool head 12, as soon as the latter exceeds a predetermined, relatively low rotational acceleration. This is explained in more detail below.

Figure 2:
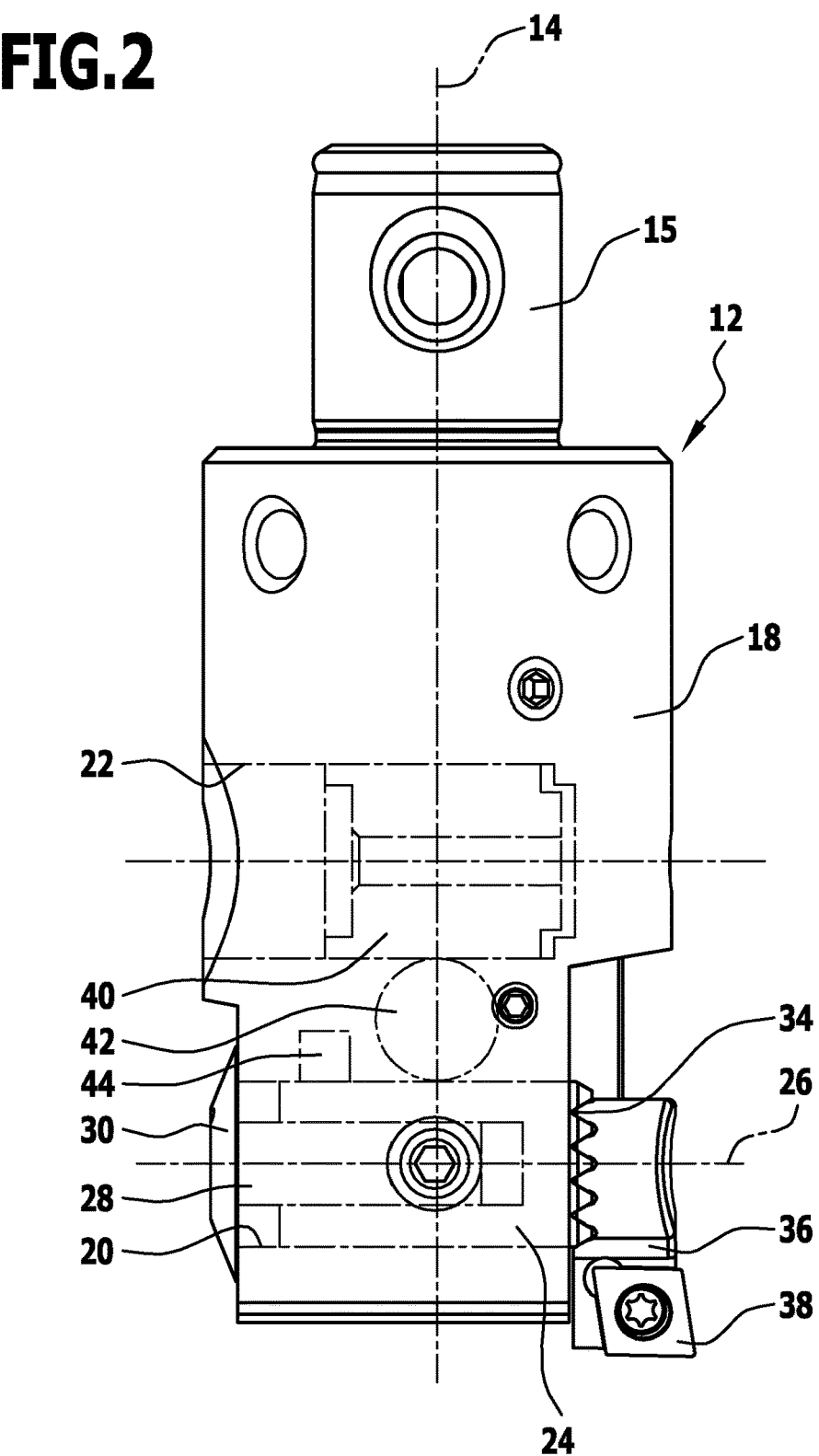
FIG. 2: shows a side view of the cutting tool apparatus in the direction of arrow A from FIG. 1.

As becomes clear in particular from FIG. 2, the tool head 12 has a shank 15 which can be clamped into a spindle of a machine tool. Furthermore, the tool head has a front recess 20 and a rear recess 22 which are each orientated perpendicularly to the axis of rotation 14. In the front recess 20, a tool slide 24 is displaceably mounted in a known manner, which tool slide can be adjusted along an adjustment axis 26. The adjustment axis 26 is orientated perpendicularly to the axis of rotation 14. To adjust the tool slide 24, use is made of a spindle 28 on which the tool slide 24 is held and which is rotatably mounted on a cover 30 of the tool head 12. In the region of the cover 30 the spindle 28 forms an engaging opening 32, into which an adjusting tool can engage in a manner fixed against relative rotation. The adjusting tool is preferably configured as a polygon. By rotating the spindle 28 about the adjustment axis 26 the tool slide 24 can be adjusted along the adjustment axis 26.

At its end side 34 facing away from the cover 30 the tool slide 24 forms a mounting surface, on which a cutting plate carrier 36 can be secured. A cutting plate 38 can be fixed in customary fashion on the cutting plate carrier 36. A workpiece can be machined in a material-removing manner by means of the cutting plate 38.

The rear recess 22 receives, in a known manner, a compensating slide 40 which is coupled via a toothed roller 42 to the tool slide 24 in such a manner that it performs a movement in the opposite direction on adjusting the tool slide 24. When the tool slide 24 is displaced along the adjustment axis 26 by means of the spindle 28, the compensating slide 40 performs a compensating movement directed opposite the movement of the tool slide 24. This has the result that the respective masses of the tool slide 24 and of the compensating slide 40 are shifted in such a manner that the tool head 12 is, overall, always balanced.

To detect the adjustment path of the tool slide 24, its position is detected in a non-contact manner by an electronic measuring device 44. Such measuring devices 44 are known per se to a person skilled in the art. The adjustment path of the tool slide 24 is detectable in a non-contact manner by means of the measuring device 44.

Figure 3:
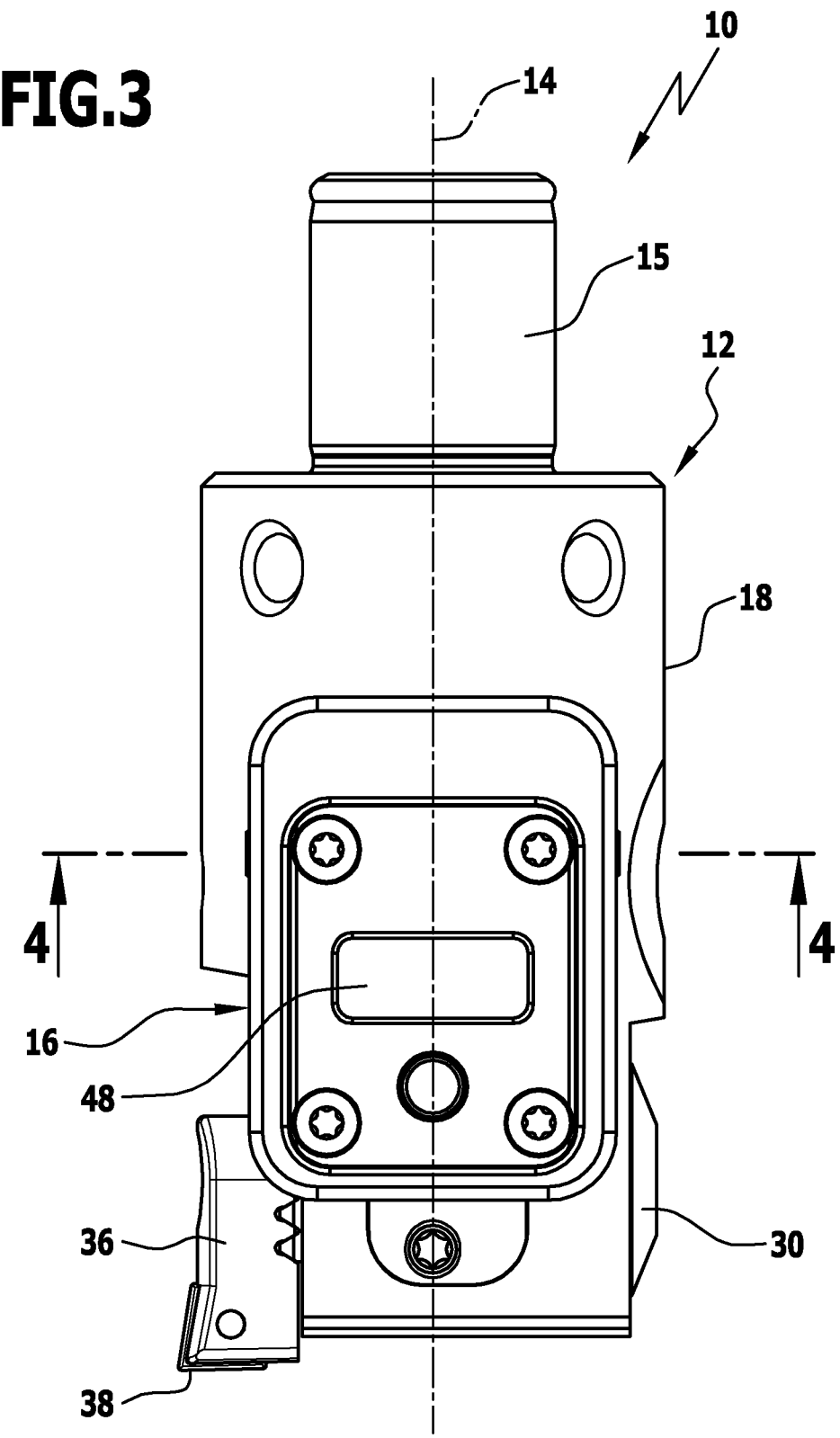
FIG. 3: shows a side view of the cutting tool apparatus in the direction of arrow B from FIG. 1.

The external display device 16 has a display unit 48, on which the adjustment path detected by the measuring device 44 can be displayed in an easily readable manner. For this purpose, the display unit 48 can be electrically connected to the measuring device 44. For this purpose, the display device 16 has, on its rear side 50 facing the tool head 12, spring-mounted first contact elements 52 which electrically and mechanically contact second contact elements 54 of the tool head 12 when the external display device 16, as illustrated in FIGS. 1 to 3, lies laterally on the tool head 12. The second contact elements 54 are arranged in a contact recess 56 of the tool head 12.

Figure 4:
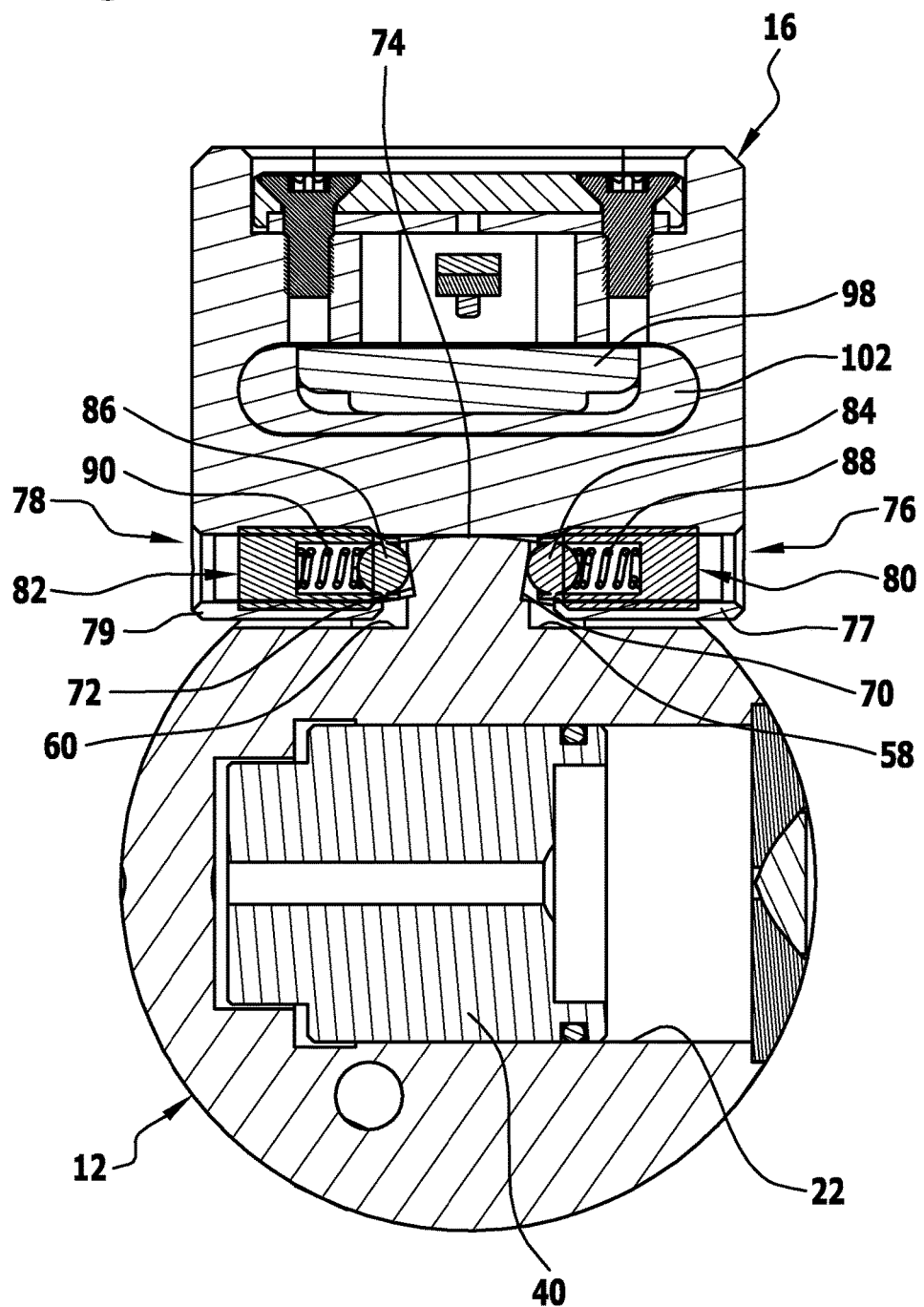
FIG. 4: shows a schematic sectional view of the cutting tool apparatus along the line 4-4 in FIG. 3.

With respect to the axis of rotation 14 in the direction of the shank 15 axially offset from the contact recess 56, the tool head 12 has holding recesses 58, 60 which are formed symmetrically to one another, are arranged at a distance from one another in the circumferential direction of the tool head 12 and are each configured in the form of a recess open on one side. They each have a plane bottom wall 62 and 64, respectively, and a U-shaped side wall 66 and 68, respectively. Each side wall 66, 68 has straight end sections which lie opposite one another and are connected to one another via a curved middle section. In the middle sections there is arranged in each case a latching indentation 70, 72. This becomes clear in particular from FIG. 4. The latching indentations 70, 72 are of wedge-shaped configuration and form an undercut.

In the region between the two holding recesses 58, 60, the tool head 12 forms a holding region 74 which extends in the circumferential direction of the tool head 12 over an angular region of less than 180°. In the exemplary embodiment illustrated, the holding region 74 extends in the circumferential direction of the tool head 12 over an angular region of about 20°. The contact recess 56 is arranged axially offset from the holding region 74.

For mechanically securing on the lateral surface 18 of the tool head 12, the substantially cuboid-shaped display device 16 has on its rear side 50 two holding members 76, 78 which are configured as projections. The holding members 76, 78 can be inserted into the holding recesses 58, 60, and in so doing they lie on the straight end sections of the side walls 66, 68 and form a form closure with the holding recesses 58, 60.

The holding members 76, 78 each have a guide part in the form of a guide sleeve 77 and 79, respectively, into which a spring-mounted pressure piece 80 and 82, respectively, is screwed. The pressure pieces 80, 82 are each provided with an external thread and the guide sleeves 77, 79 each have an internal thread. The pressure pieces 80, 82 comprise a spherical pressure body 84 and 86, respectively, and a compression spring 88 and 90, respectively, which subjects the pressure body 84 and 86, respectively, to a spring force. The spring forces acting on the pressure bodies 84, 86 are directed opposite one another. The pressure pieces 80, 82 are aligned flush with one another, as are the guide sleeves 77, 79, so that the pressure bodies 84, 86 clamp the holding region 74 of the tool head 12 between them. In so doing, the spherical pressure bodies 84, 86 each penetrate into a latching indentation 70 and 72, respectively, of the side walls 66, 68 of the holding recesses 58, 60. This becomes clear in particular from FIG. 4.

The holding force exerted on the holding region 74 by the pressure bodies 84, 86 can be set by screwing the pressure pieces 80, 82 to a greater or lesser extent into the guide sleeves 77, 79. The spring-mounted pressure pieces 80, 82 thus form in combination with the guide sleeves 77, 79 setting mechanisms for setting the holding force which is exerted on the tool head 12 by the display device 16. The holding forces act on the wedge-shaped latching indentations 70, 72. By changing the wedge angle, the force required for releasing the display device 16 from the tool head 12 can be likewise changed.

In addition to the display unit 48 the display device 16 has an energy supply unit in the form of a battery 98 which is arranged in a battery holder 102. The battery holder 102 is configured in the manner of a drawer and can be removed together with the battery 98 of the display device 16, in order to exchange to battery 98. With the aid of the battery 98, the measuring device 44 of the tool head 12 can be supplied with electrical energy. The electrical energy is transmitted, as is the measuring information provided by the measuring device 44, via the first and second contact elements 52, 54 when the display device 16 is secured on the lateral surface 18 of the tool head 12.

Figure 5:
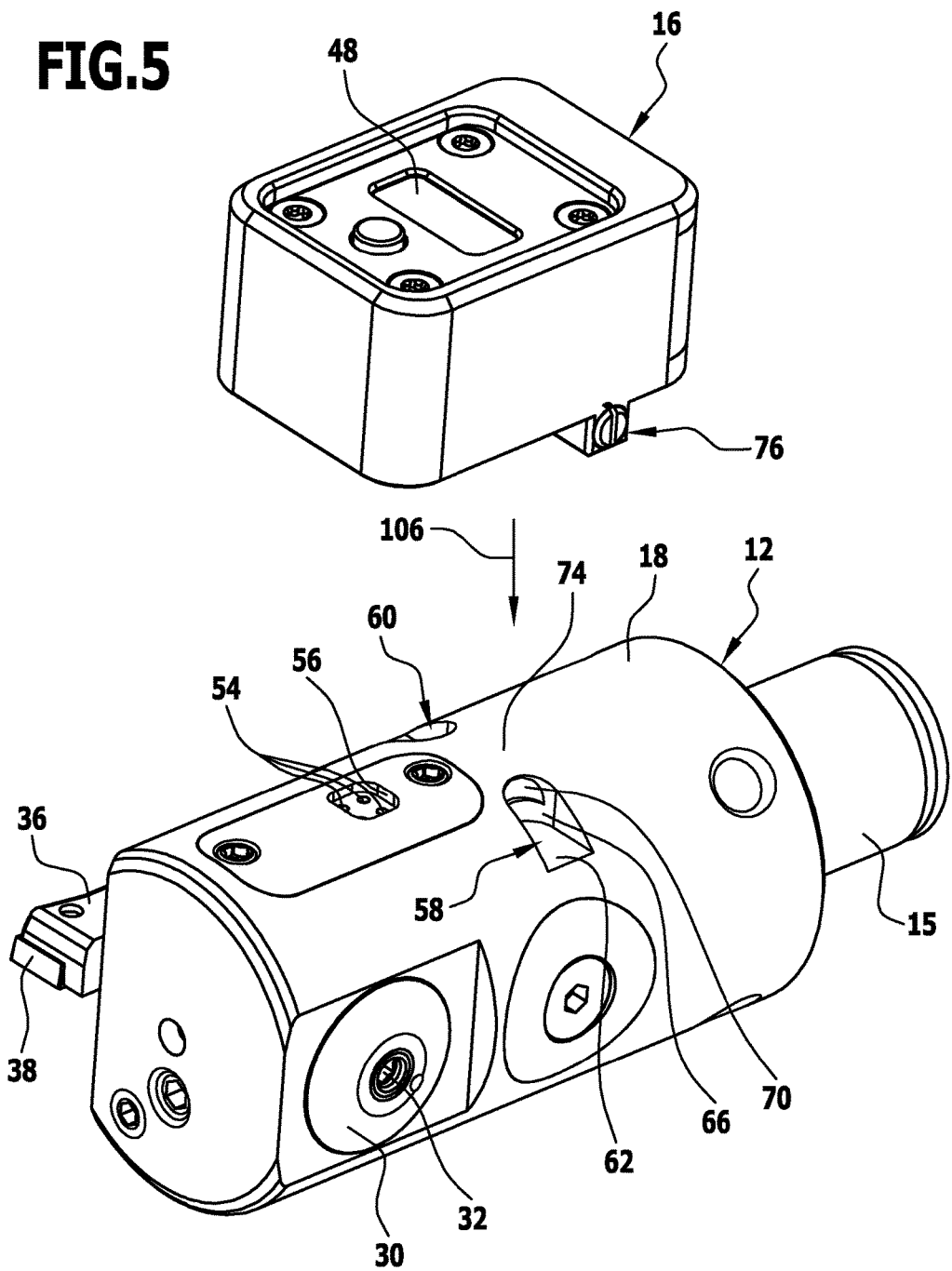
FIG. 5: shows a perspective illustration of the cutting tool apparatus from FIG. 1 in the direction of a front side of the external display device, the display device being at a distance from the tool head.
Figure 6:
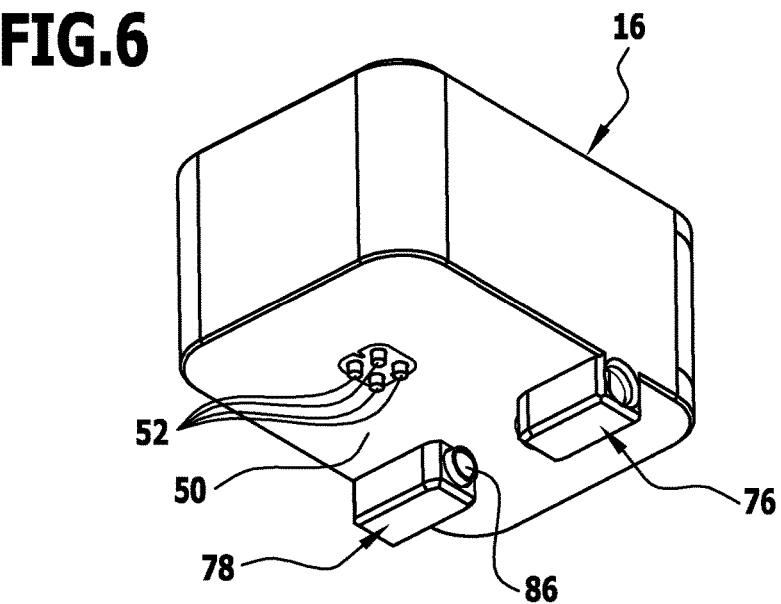
FIG. 6: shows a perspective illustration of the cutting tool device from FIG. 1 in the direction of a rear side of the external display device, the display device being at a distance from the tool head.
Figure 6:
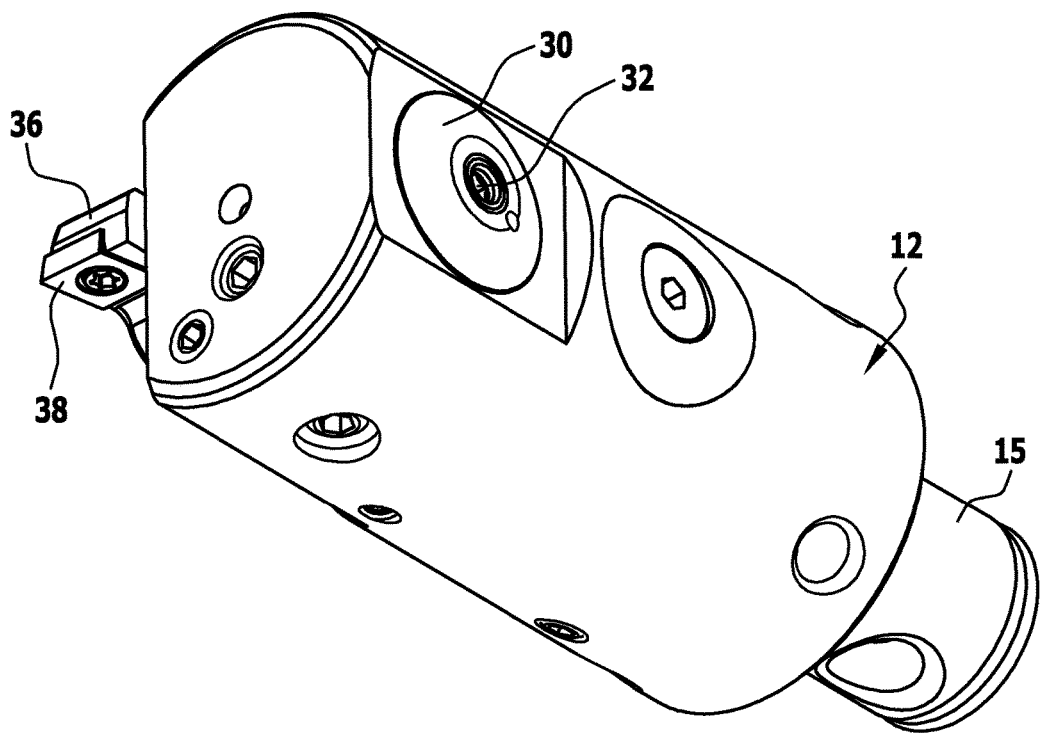
Figure 7:
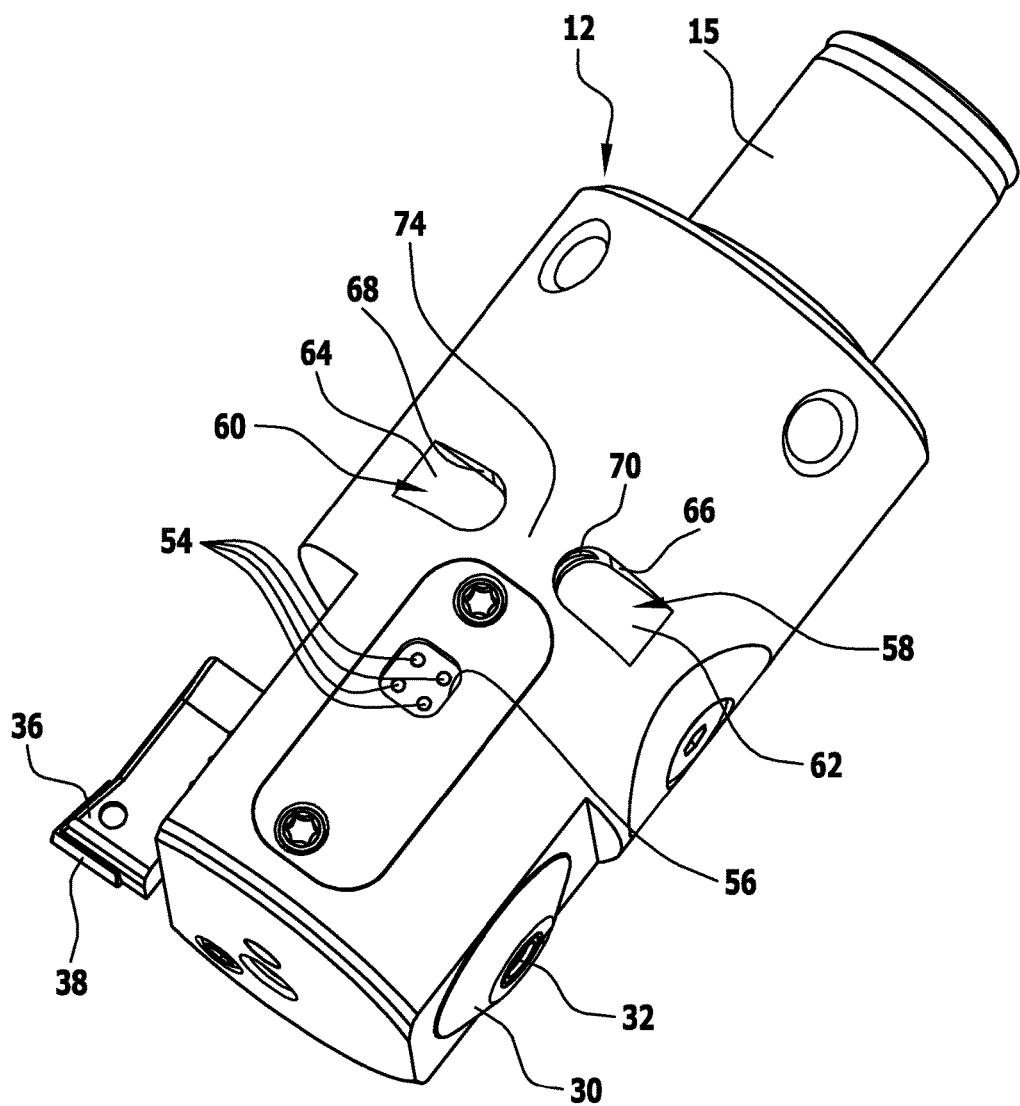
FIG. 7: shows a perspective illustration of the tool head of the cutting tool apparatus from FIG. 1.

The display device 16 can be laid laterally onto the lateral surface 18 of the cylindrical tool head 12, in a joining direction, symbolised by the arrow 106 in FIG. 5, which is orientated perpendicularly to the axis of rotation 14, so that the holding members 76, 78 penetrate into the holding recesses 58, 60 and the pressure bodies 84, 86 latch into the latching indentations 70, 72. The holding force which is exerted by the display device 16 on the tool head 12 can be set by screwing the pressure pieces 80, 82 to a greater or lesser extent into the guide sleeves 77, 79. By predetermining the holding force, it can be ensured that the display device 16 is automatically released from the tool head 12 as soon as the rotational speed of the tool head 12 changes greatly within a short time interval, i.e. as soon as the rotational acceleration of the tool head 12 exceeds a predetermined limit value. The limit value can be chosen in such a manner that it is ensured that the display device 16 is released, when the tool head 12 is set in rotation, even before the latter has a high rotational speed. On the automatic release of the display device, the latter is therefore accelerated at most slightly in the radial direction.

If the tool head, starting from a rest position, changes into a rotational movement, the inertia of the display device 16 arranged laterally on the tool head 12 counteracts the rotational movement. As a result of this, the display device 16 undergoes a tilting moment. The greater the rotational acceleration of the tool head 12 is, the greater the tilting moment 12 will be. If the rotational acceleration exceeds a predetermined value, the display device is automatically released from the tool head 12 by the holding members 76, 78 being released from the holding recesses 58, 60. The size of the holding force which the holding members exert on the tool head 12 determines the rotational acceleration, on the exceeding of which the display device is released from the tool head 12. The holding force is influenced by the distance between the pressure bodies 84, 86, and can be set by screwing the pressure pieces 80, 82 to a greater or lesser extent into the guide sleeves 77, 79.

The display device 16 can be reliably secured on the stationary tool head 12, so that the user has both hands free to precisely set the tool slide 24 and thus also the cutting plate 38. If, after the setting has taken place, the user forgets to release the display device 16 from the tool head 12 and sets the tool head 12 in rotation, the display device 16 is automatically released from the tool head even at a very low rotational speed and falls vertically downwards owing to its weight. There is thus no danger of the display device 16, inadvertently left on the tool head 12, being hurled away from the tool head 12 in the manner of a projectile in the radial direction and constituting a danger to health for the user.

What is claimed is:

1. Cutting tool apparatus comprising a tool head rotatingly drivable about an axis of rotation, which tool head has a tool slide adjustable along an adjustment axis and an electrical measuring device for detecting an adjustment path of the tool slide, and comprising an external display device which is mechanically and electrically releasably connectable to the tool head and has a display unit for displaying the adjustment path of the tool slide, wherein the display device is mechanically securable on the stationary tool head in order to set the tool slide and is automatically releasable from the tool head if a predeterminable rotational acceleration of the tool head is exceeded.

2. Cutting tool apparatus according to claim 1, wherein the display device is layable onto a lateral surface of the tool head in a joining direction orientated obliquely or perpendicularly to the axis of rotation.

3. Cutting tool apparatus according to claim 2, wherein the tool head has a cylindrical lateral surface and the display device has a plane rear side, with which it contacts the cylindrical lateral surface linearly.

4. Cutting tool apparatus according to claim 1, wherein the display device is releasably latchable to the stationary tool head.

5. Cutting tool apparatus according to claim 1, wherein the display device has at least one holding member, the tool head being subjectable to a predeterminable holding force by the at least one holding member.

6. Cutting tool apparatus according to claim 5, wherein the at least one holding member has a setting mechanism for setting the holding force exerted on the tool head by the holding member.

7. Cutting tool apparatus according to claim 5, wherein the at least one holding member is able to be mechanically brought into engagement with the tool head.

8. Cutting tool apparatus according to claim 5, wherein the display device has two holding members which are insertable into two holding recesses arranged at a distance from one another in the direction of rotation of the tool head.

9. Cutting tool apparatus according to claim 8, wherein the holding recesses are open at their outer sides facing away from one another.

10. Cutting tool apparatus according to claim 8, wherein at their mutually facing inner sides the holding recesses have each at least one latching element which cooperates with an associated latching element of the holding member insertable into the holding recess.

11. Cutting tool apparatus according to claim 8, wherein the two holding members each form a form closure with the holding recesses.

12. Cutting tool apparatus according to claim 8, wherein the holding members receive between them a holding region of the tool head extending over an angular region of less than 180° in the circumferential direction.

13. Cutting tool apparatus according to claim 12, wherein the holding members have spring-mounted pressure pieces lying opposite one another.

14. Cutting tool apparatus according to claim 13, wherein the pressure pieces are aligned flush with one another.

15. Cutting tool apparatus according to claim 13, wherein the pressure pieces each have a pressure body which is subjectable to a spring force by a compression spring, the spring forces of the two pressure pieces being directed opposite one another.

16. Cutting tool apparatus according to claim 8, wherein the holding members form projections which project from a rear side of the display device facing the tool head.

17. Cutting tool apparatus according to claim 1, wherein the display device and the tool head have electrical contact elements associated with one another to establish an electrical connection between the measuring device and the display unit.

18. Cutting tool apparatus according to claim 8, wherein the display device and the tool head have electrical contact elements associated with one another to establish an electrical connection between the measuring device and the display unit, the contact elements of the display device being arranged axially offset from the holding members.

19. Cutting tool apparatus according to claim 18, wherein the tool head has a contact recess, in which the contact elements of the tool head are arranged.

20. Cutting tool apparatus according to claim 1, wherein the display device has an energy supply unit.

* * * * *